July 9, 1957 J. R. SIBLEY 2,798,713
APPARATUS FOR CONTINUOUS MINING AND LOADING
Filed July 5, 1949 12 Sheets-Sheet 5
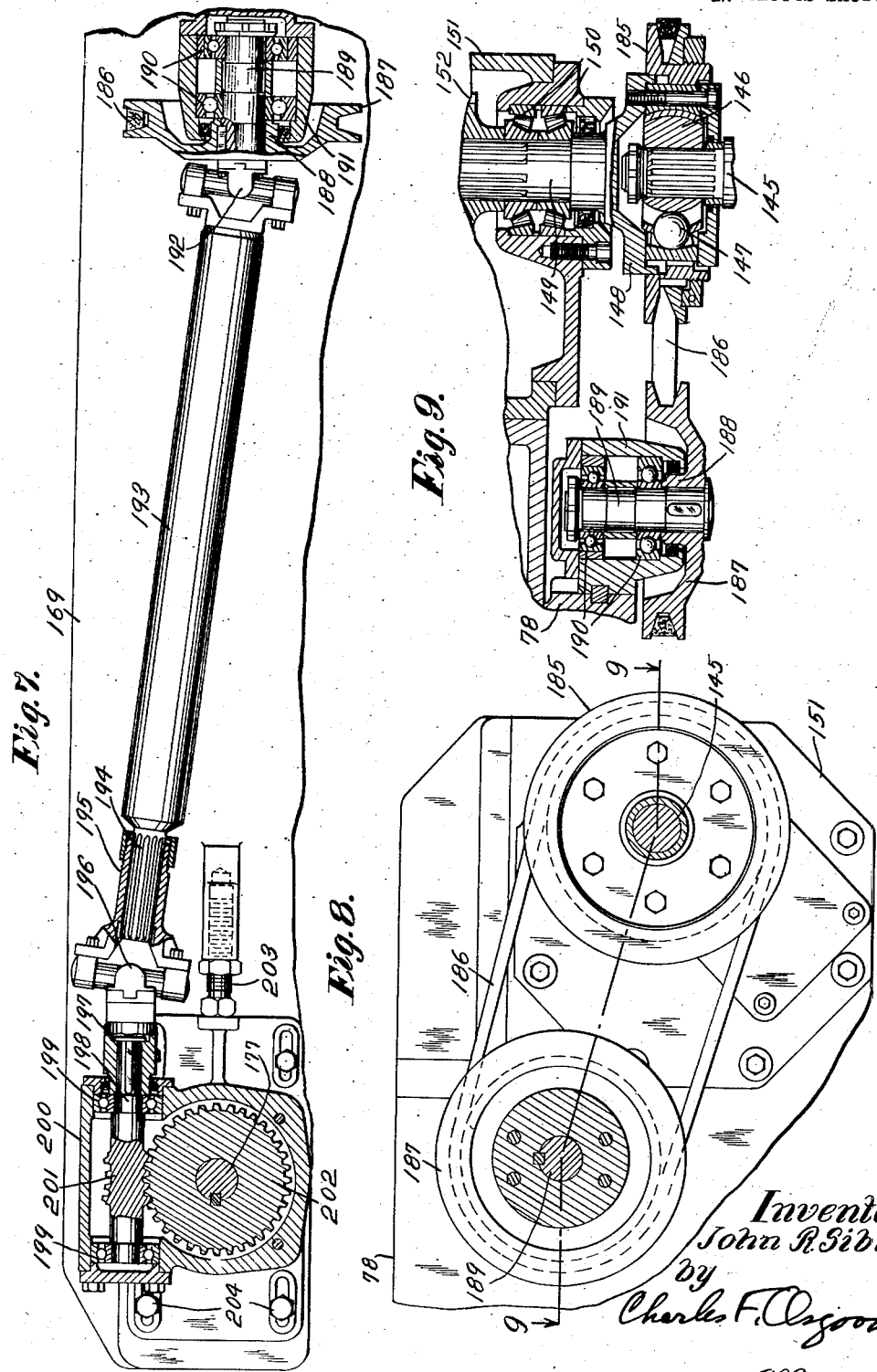
Inventor:
John R. Sibley,
by
Charles F. Osgood,
Attorney.

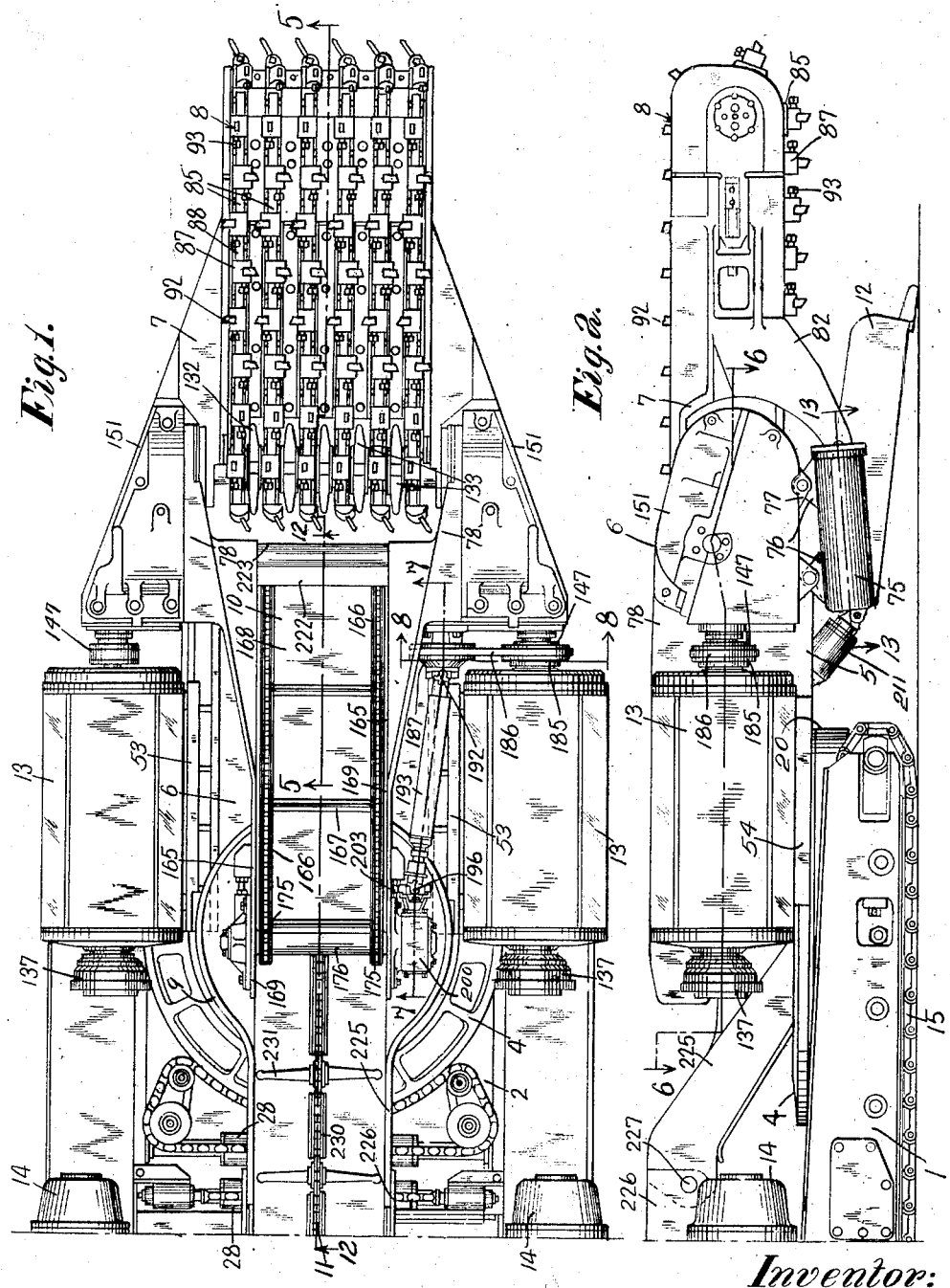

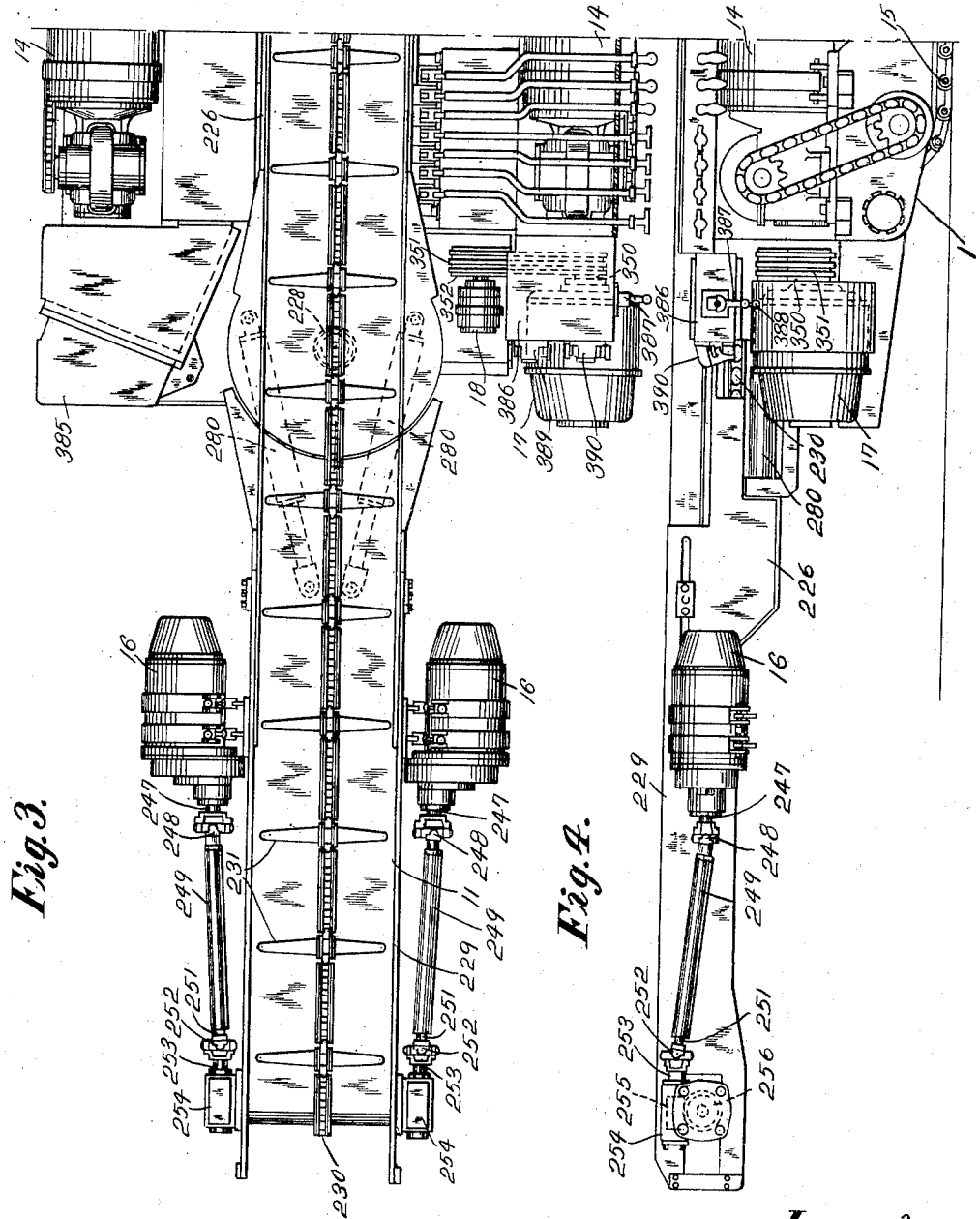

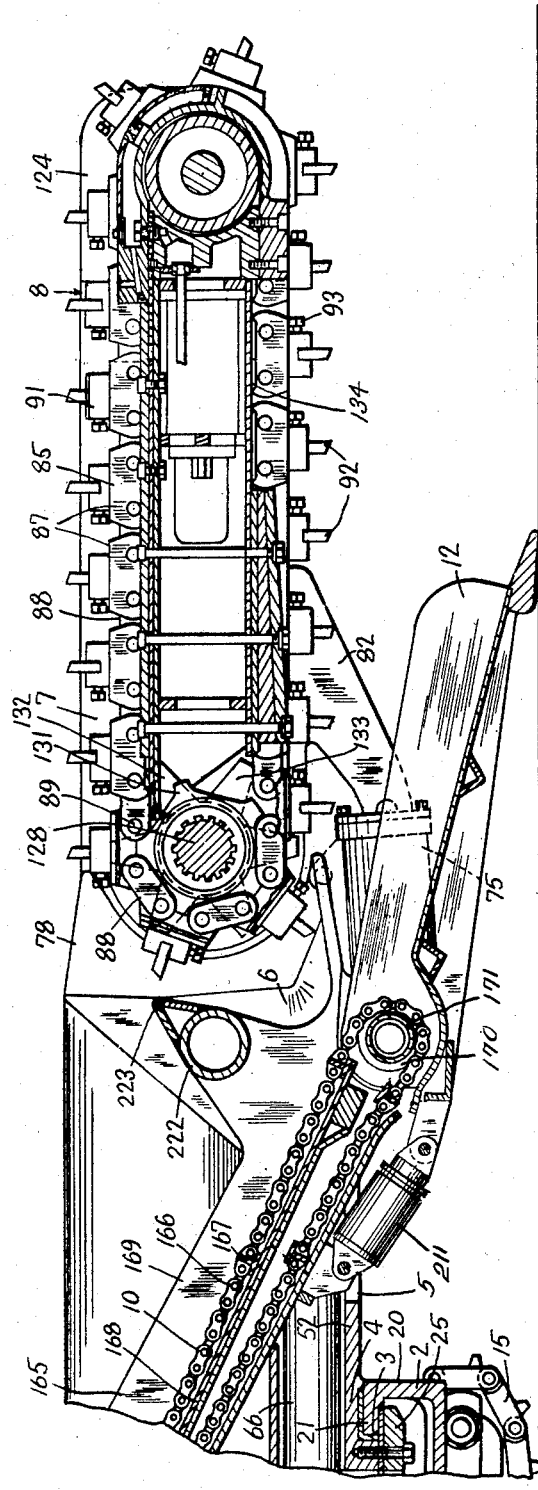

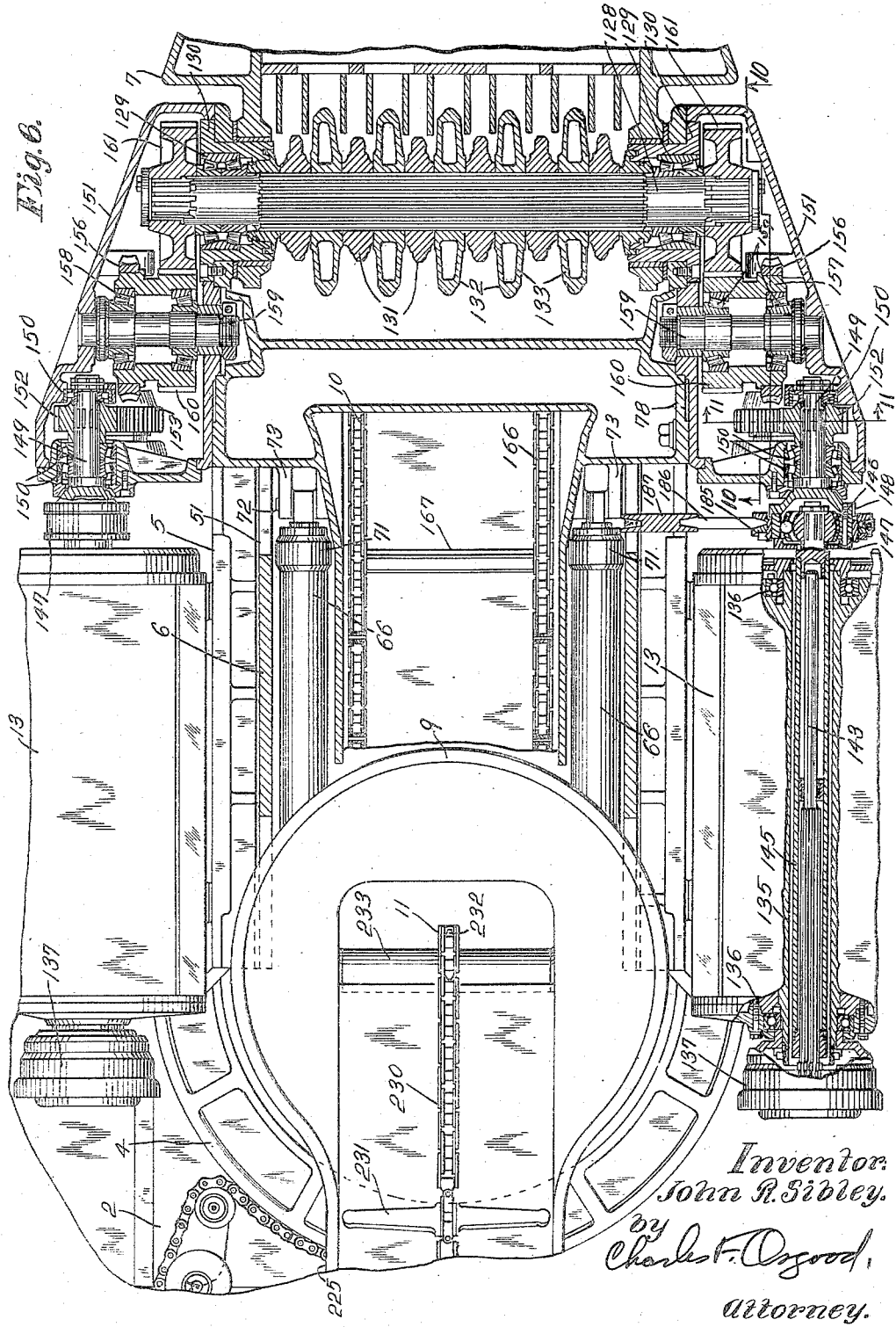

July 9, 1957 J. R. SIBLEY 2,798,713
APPARATUS FOR CONTINUOUS MINING AND LOADING
Filed July 5, 1949 12 Sheets-Sheet 6

Inventor:
John R. Sibley.
by Charles F. Osgood,
Attorney.

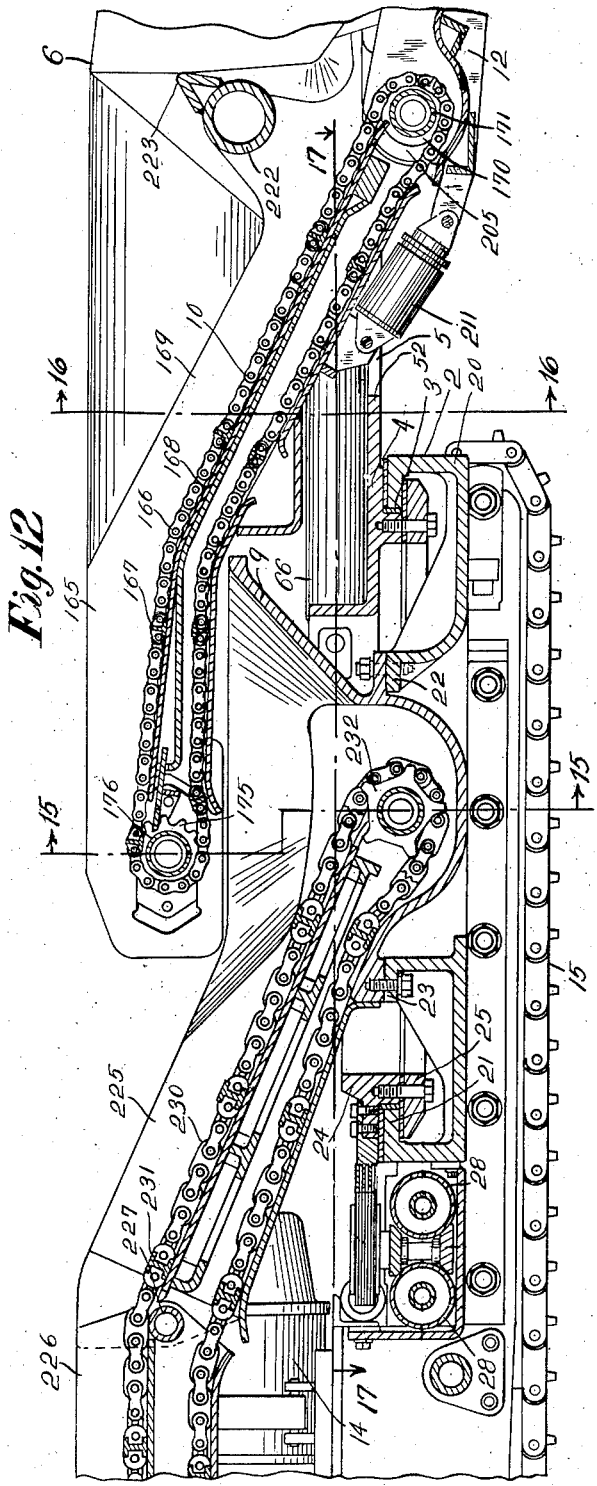

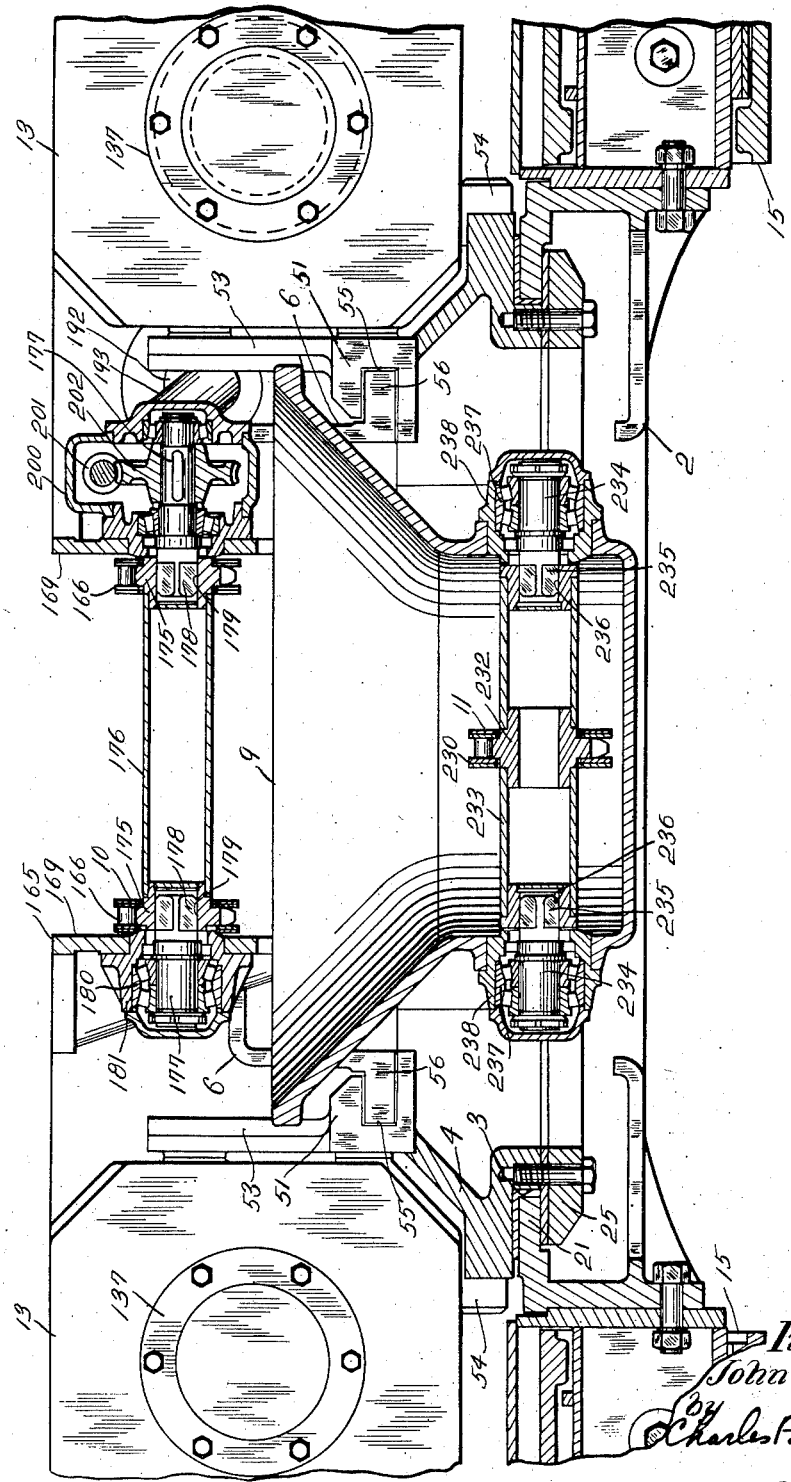

July 9, 1957 J. R. SIBLEY 2,798,713
APPARATUS FOR CONTINUOUS MINING AND LOADING
Filed July 5, 1949 12 Sheets-Sheet 9

Inventor:
John R. Sibley.
by Charles F. Osgood,
Attorney.

July 9, 1957  J. R. SIBLEY  2,798,713
APPARATUS FOR CONTINUOUS MINING AND LOADING
Filed July 5, 1949  12 Sheets-Sheet 12

Inventor:
John R. Sibley.
by Charles F. Osgood,
Attorney

United States Patent Office

2,798,713
Patented July 9, 1957

2,798,713

APPARATUS FOR CONTINUOUS MINING AND LOADING

John R. Sibley, Franklin, Pa., assignor to Joy Manufacturing Company, Pittsburgh, Pa., a corporation of Pennsylvania Application July 5, 1949, Serial No. 102,996

9 Claims. (Cl. 262—29)

This invention relates to mining apparatus and more particularly to an improved continuous mining apparatus for mining coal or similar minerals from a solid coal seam or mine vein without the use of explosives, and for loading the material removed from the coal seam or mine vein as mining progresses.

An object of the present invention is to provide an improved mining and loading apparatus especially designed for use in underground mines whereby the coal or other mineral may be rapidly removed from a solid mine vein or coal seam and conveyed away from the face, in a continuous operation and without the necessity of blasting. Another object is to provide an improved continuous mining apparatus which is extremely low in height and readily maneuverable. A further object is to provide an improved mining and loading apparatus having improved vein-attacking and disintegrating mechanism for removing the coal or other mineral from the solid, and having improved means for receiving and collecting the disintegrated material irrespective of the positions of adjustment in operation of the vein-attacking and disintegrating mechanism. Yet another object is to provide an improved mining apparatus having a novel compact arrangement of parts, resulting in extreme low height while providing a powerful and rugged structure, well adapted to meet the most severe demands of service. A further object is to provide, in an apparatus of the above character, an improved arrangement of the conveyors, together with a novel location of the hopper whereby the disintegrated material may be rapidly collected and moved rearwardly of the apparatus during the vein-attacking and dislodging operation. Yet another object is to provide improved means for ejecting the disintegrated material from between the rear portions of the disintegrating chains and for deflecting the material from the chain paths, and to direct the material toward the front conveyor. A further object is to provide, in an apparatus of the character specified, an improved arrangement of the material receiving hopper with respect to the swivel mounting for the horizontally swingable frame. These and other objects and advantages of the invention will, however, hereinafter more fully appear.

In the accompanying drawings there is shown for purposes of illustration one form which the invention may assume in practice.

In these drawings:

Figs. 1 and 3, taken together, constitute a plan view of an illustrative embodiment of the improved mining and loading apparatus.

Figs. 2 and 4, taken together, constitute a side elevational view of the apparatus shown in Figs. 1 and 3.

Fig. 5 is an enlarged view in longitudinal vertical section, taken substantially on line 5—5 of Fig. 1.

Fig. 6 is an enlarged horizontal sectional view taken substantially on line 6—6 of Fig. 2.

Fig. 7 is an enlarged vertical sectional view taken substantially on lines 7—7 of Fig. 1, showing a portion of the drive for the front loading conveyor.

Fig. 8 is an enlarged detail cross-sectional view taken on line 8—8 of Fig. 1.

Fig. 9 is a detail cross-sectional view taken on line 9—9 of Fig. 8.

Fig. 12 is an enlarged view in longitudinal vertical section, taken substantially on line 12—12 of Fig. 1.

Fig. 13 is an enlarged detail sectional view taken on line 13—13 of Fig. 2, illustrating one of the vertical-swing cylinders for the vein-attacking and disintegrating mechanism.

Fig. 14 is a detail sectional view taken on line 14—14 of Fig. 13.

Fig. 15 is a cross-sectional view taken on line 15—15 of Fig. 12, on an enlarged scale.

Figure 10:
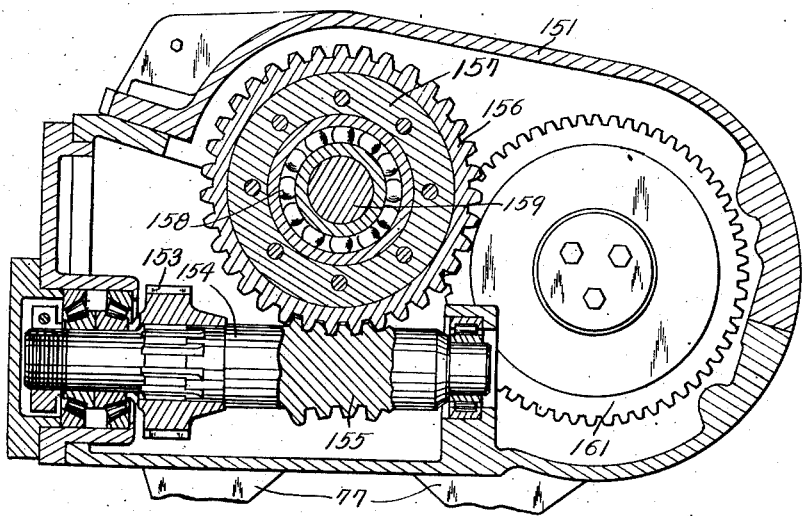
Fig. 10 is an enlarged vertical sectional view taken on line 10—10 of Fig. 6, illustrating a portion of the driving gearing of the vein-attacking and disintegrating mechanism.
Figure 11:
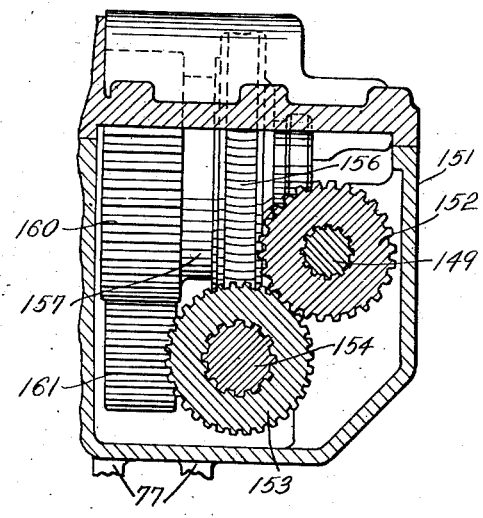
Fig. 11 is an enlarged detail transverse vertical sectional view taken on line 11—11 of Fig. 6.

The mining and loading apparatus of the present invention constitutes an improvement over that of the Harold F. Silver application, Serial No. 11,688, filed Feb. 27, 1948, owned by the assignee of this present application.

As shown in the drawings, the mining and loading apparatus generally comprises a mobile base 1, herein preferably a tractor or crawler base, having a frame 2 which has swiveled thereon at 3, to swing about an upright axis in horizontal planes with respect thereto, a horizontal supporting frame or turntable 4. The swiveled supporting frame or turntable has a horizontal portion 5 projecting forwardly in advance of the base 1, and guided on this horizontal frame portion for movement rectilinearly relative thereto in a radial direction relative to the swivel axis is a sliding frame or support 6, on which a swingable frame or bar structure 7 is pivotally mounted on a horizontal transverse axis to swing in vertical planes with respect thereto and to swing horizontally with the swiveled supporting frame or turntable 4 relative to the base 1. The vertically swingable frame or bar structure 7 extends forwardly in advance of the swiveled frame, with its pivotal axis located, when the sliding frame 6 is retracted, a substantial distance in advance of the base. The swingable frame structure 7 carries a mine vein-attacking and disintegrating mechanism generally designated 8 for detaching and disintegrating the coal or similar mineral in vertical segments from a solid coal seam or mine vein. The vein-attacking and disintergrating mechanism 8, when disposed in a horizontal position as shown in Fig. 2, has its upper limits disposed below the upper limits of the apparatus, thereby resulting in a construction which is extremely vertically compact. Arranged substantially coaxially with the swivel of the horizontally swinging frame is a receiving and collecting means, preferably in the form of a hopper 9, which is mounted in stationary relation with respect to the base frame; and a front loading conveyor 10, carried by the sliding frame 6, serves to convey the disintegrated coal or other mineral discharged from the vein-attacking and disintegrating mechanism rearwardly of the sliding frame to the hopper. Mounted on the base frame is a rear discharge conveyor 11 which has its receiving end projecting downwardly within the hopper for moving the disintegrated coal or other mineral from the hopper rearwardly of the apparatus to a suitable point of delivery remote from the vein-attacking and disintegrating mechanism. The rear discharge end of the front conveyor overlies the hopper and is so arranged that it discharges into the hopper in all positions of the sliding frame with respect to the horizontally swiveled frame. The vein-attacking and disintegrating mechanism 8 detaches the coal or other mineral from the coal seam or mine vein, and as the mineral is detached or torn away toward the free face of the vein or seam, it is moved by the vein-attacking and disintegrating mechanism rearwardly along the top thereof to discharge onto the front conveyor 10, which in turn discharges into the hopper 9; and the disintegrated coal or other mineral is discharged from the hopper and conveyed rearwardly of the apparatus by the rear discharge conveyor. Carried by the sliding frame 6 beneath the rearward portion of the vein-attacking and disintegrating mechanism, in a manner described and claimed in a copending application of John D. Russell, Serial No. 102,995 filed of even date herewith, owned by the assignee of this present application, is a shovel or material pushing element 12 for moving forwardly loose coal or mineral which has fallen to the mine floor, and bringing it into the field of action of the outwardly moving disintegrating elements of the vein-attacking and disintegrating mechanism.

A pair of motors 13, 13, preferably electric motors, carried by the swiveled supporting frame or turntable 4 at the opposite sides of the hopper, serve to drive the vein-attacking and disintegrating mechanism 8, and these motors drive the front conveyor 10; a pair of reversible motors 14, 14, prefearably electric motors, individually drive endless crawler treads 15, 15 of the tractor base; and a pair of motors 16, 16 preferably electric motors, drive the rear discharge conveyor 11. A motor 17, likewise preferably an electric motor, drives a pumping means 18 for delivering liquid under pressure to the various hydraulically operated devices of the apparatus. The crawler treads 15 of the tractor base serve to propel the apparatus about the mine and to steer the apparatus. By swinging the vein-attacking and disintegrating mechanism 8 about the swivel axis of the supporting frame or turntable 4, it may be located in different radial positions relative to the base to attack and disintegrate the coal seam or mine vein in a series of vertical segments of the working face so that the entire width of the working face may be dislodged and disintegrated in successive steps, and the front conveyor is arranged to discharge into the hopper in all radially adjusted positions of the vein-attacking and disintegrating mechanism.

The frame 2 of the tractor or crawler base 1 has an annular portion 20 arranged in a low position between the tractor treads and providing an open center and having an inwardly directed circular flange 21. Arranged within the open center of the annular frame are front and rear transverse brackets 22 and 23 rigidly secured by horizontal webs to the annular portion 20, and the hopper 9 is arranged centrally of the annular frame and is supported by and secured to the transverse brackets in the manner shown in Fig. 12. Thus, the hopper is rigidly supported in a stationary position on the base frame. The circular flange 21 supports bearings on which an annular portion 24 of the swiveled supporting frame or turntable 4 is rotatably mounted, and this annular portion surrounds the hopper in the manner shown. A segmental retaining ring 25, secured as by screws to the annular portion 24, serves to retain the swiveled supporting frame on its bearing mounting. The lower portion or closed bottom of the hopper 9 projects downwardly within the open center of the annular frame below the bottom surface of the retaining ring 25, thereby to provide an extremely low compact construction.

Figure 16:
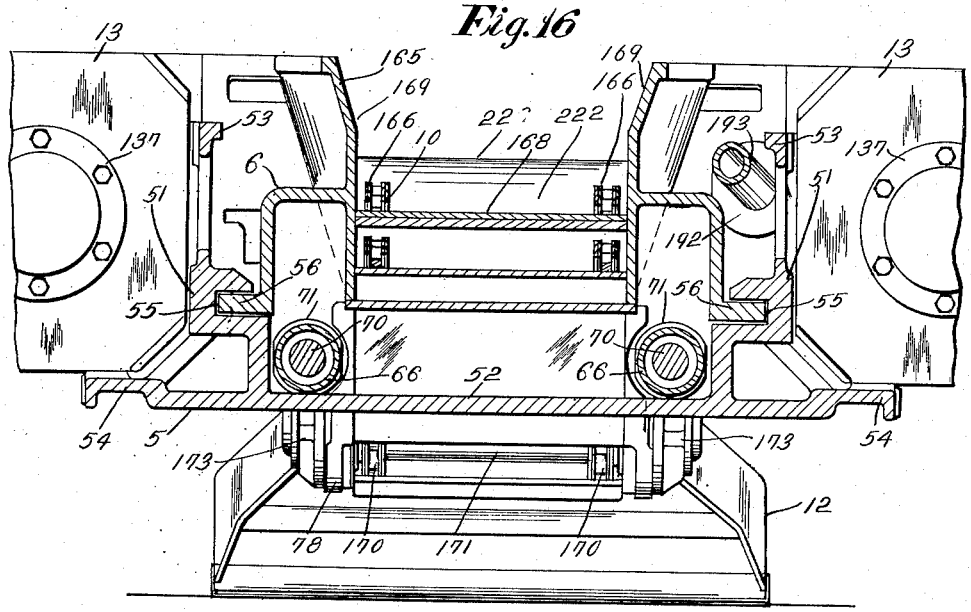
Fig. 16 is a cross-sectional view taken on line 16—16 of Fig. 12.
Figure 17:
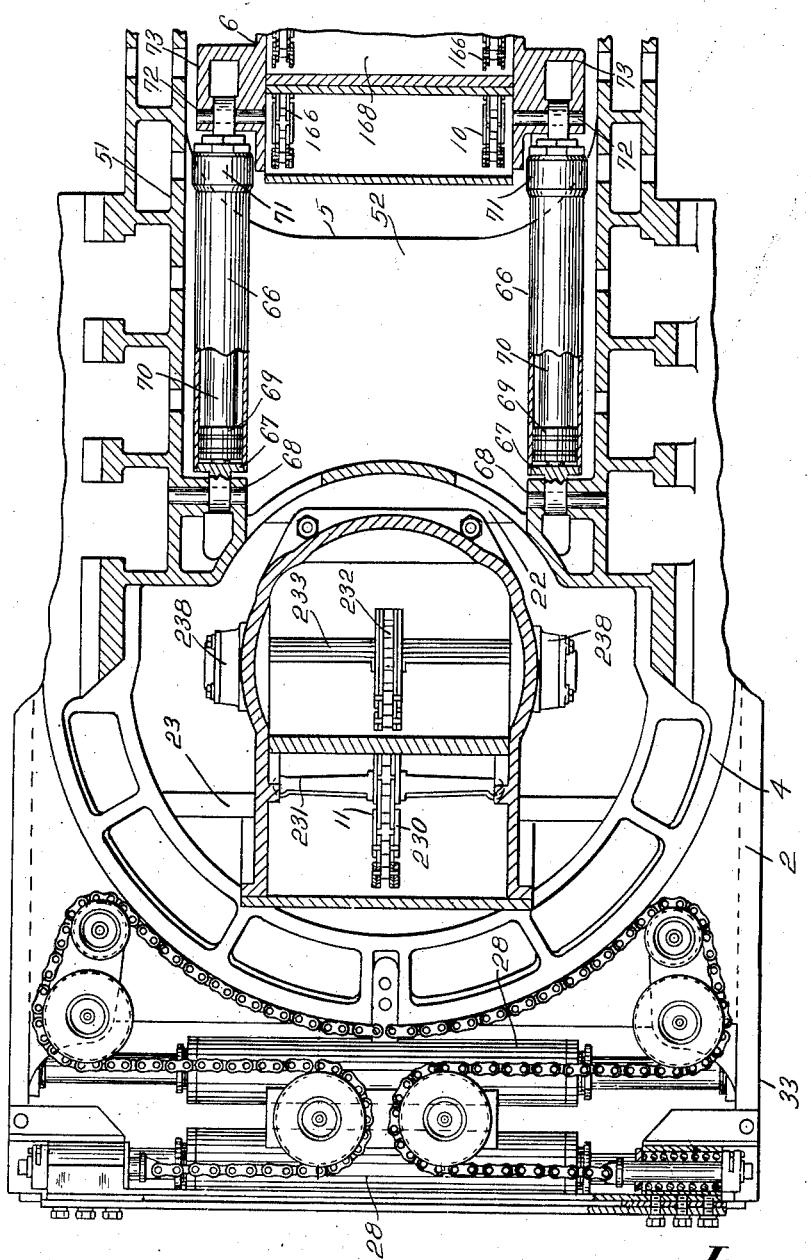
Fig. 17 is a horizontal sectional view taken substantially on line 17—17 of Fig. 12.
Figure 18:
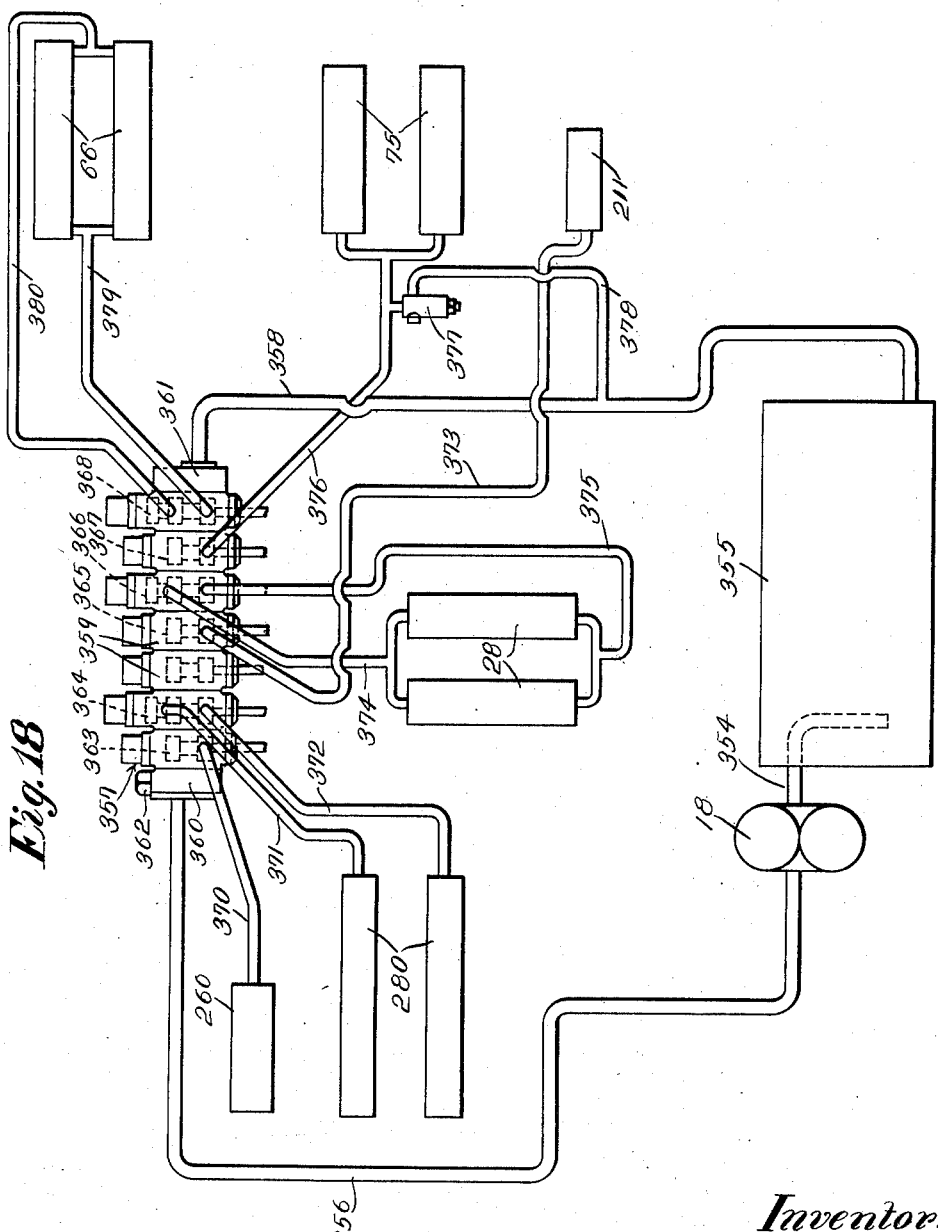
Fig. 18 is a diagrammatic view illustrating the hydraulic fluid system and associated control means.

The horizontal forward portion 5 of the swiveled supporting frame 4 has laterally spaced parallel side portions 51, 51 braced by a transverse horizontal portion or web 52, and the motors 13 are secured to the outer sides of these side frame portions, as shown in Figs. 6, 15 and 16. The side frame portions 51 have vertical and horizontal bracket portions 53 and 54 integral therewith which respectively extend along the inner sides and project beneath the bottoms of the motors to provide rigid supports for the latter. Extending longitudinally along the inner sides of the side frame portions 51 are horizontal guideways 55 which receive lateral guides 56 on the sliding frame or support 6.

Suitable hydraulic means is provided for reciprocating the sliding frame or support 6, and for this purpose I have illustrated an arrangement disclosed and claimed in the copending Russell application, which arrangement includes, arranged longitudinally along the inner sides of the parallel side frame portions 51 of the swiveled supporting frame or turntable 4, double acting, hydraulic feed cylinders 66, 66 having lugs integral with their rear heads 67 pivotally connected to transverse pivot pins 68 secured in bores in the side portions 51. Reciprocable in these cylinders are pistons 69 having piston rods 70 extending forwardly through the front packed cylinder heads 71. The front ends of the piston rods have lugs pivotally connected to transverse pivot pins 72 secured in bores in lateral brackets 73 integral with the sliding frame or support 6. When liquid under pressure is supplied to one end or the other of the cylinders 66, the pistons 69 may be moved to feed the sliding frame 6 rectilinearly back and forth along the guideways 55. By trapping liquid in the feed cylinders, the pistons may be locked in position to hold the sliding frame against sliding movement. The means for supplying liquid under pressure to the cylinders 66 will later be described.

As above indicated, suitable means is provided for swinging the frame structure 7 which carries the vein-attacking and disintegrating mechanism 8, and as a desirable means for this purpose there is shown structure which is an improvement over one which is described and claimed in the above mentioned Russell application and which comprises a pair of single acting hydraulic cylinders 75 (see Figs. 2, and 13) having upstanding lugs 76 at their upper sides secured, as by bolts, to depending lugs 77 mounted on the spaced front side portions 78 of the sliding frame 6. The cylinders are arranged in parallel relation at the outer sides of the gathering head or shovel 12 with their axes inclined slightly upwardly and forwardly, and reciprocable in these cylinders are pistons 79. The pistons are pivotally connected to pitmen 80 which extend forwardly outwardly through the open front ends of the cylinders, and the front ends of the pitmen are pivotally connected at 81 to rearwardly curved depending arms 82 secured to the outer sides of the swingable frame structure 7. When liquid under pressure is supplied to the rear ends of the cylinders 75, the pistons 79 are moved forwardly to swing the frame or bar structure 7, together with the vein-attacking and disintegrating mechanism 8 carried thereby upwardly about its pivot. By trapping liquid in the cylinders, the frame structure may be locked in adjusted position, and upon appropriate venting of liquid from the cylinders, the frame structure may be permitted to swing downwardly about its pivot at a controlled rate. The means for supplying liquid under pressure to and for venting liquid from the cylinders will later be described.

The vein-attacking and disintegrating mechanism 8 comprises a series of endless disintegrating chains 85 guided in parallel guideways 86 for circulation in vertical orbital paths. Each chain comprises a series of chain blocks 87 pivotally connected by intermediate strap links 88 which are pivotally connected to the blocks by hinge pins 89. The blocks have usual lateral gibs at their bases received in the guideways, and projecting laterally from the blocks are lugs 91 which have sockets for receiving disintegrating elements, herein in the form of conventional cutter bits 92, held in position on the lugs by conventional set screws 93. It will be noted, however, that six chains are shown for purposes of illustration, that the corresponding bits in each chain are similarly disposed, that the bits are arranged in rows perpendicular to the planes of their orbital movement, and that most of the bits have their tips, as they pass along the plane portions of their orbits, in a common plane.

The driving connections between the motors 13 and the disintegrating chains may assume various forms but are herein, for illustrative purposes, shown like those described and claimed in the copending Russell application above referred to. It will be noted that arranged coaxial with the swingable frame pivot is a transverse drive shaft 128 suitably journaled in bearings 129 supported in brackets 130 secured to the side portions 78 of the sliding frame 6. Keyed to this shaft 128 is a series of chain sprockets 131 which engage and drive the endless disintegrating chains. Also keyed to the shaft 128 between the chain sprockets there are provided impeller elements 132 having radial arms 133 projecting outwardly beyond the sprocket teeth for ejecting the disintegrated material from between the chains as the latter travel around the chain sprockets. As the disintegrating chains move forwardly beneath the sprockets, the gibs on the block bases enter the widened mouths of the tapered, lower guides to direct the lower chain runs forwardly and, with the bar frame horizontal or upwardly inclined, upwardly toward the bar frame so that undue sagging of the lower chain runs is prevented. The short bottom guides provide an open space or gap 134 which the bottom chain runs transverse as they travel toward the outer end of the bar frame, thereby to permit any dirt to drop down by gravity from the chains. Each motor 13 has a horizontal tubular motor shaft 135 (see Fig. 6) journaled in bearings 136 supported within the motor heads, and secured to the rear end of the tubular shaft is a housing element 137 for a conventional clutch, which is set to slip at a predetermined load. This clutch is connected to a drive shaft 143 which extends forwardly into the tubular motor shaft, as shown in Fig. 6. The shaft 143 has a conventional sliding splined connection within a tubular shaft 145, also arranged within the motor shaft and keyed at its forward end to an inner element 146 of a universal coupling 147 similar to the coupling 141. Secured to the outer element 148 of this coupling is a shaft 149 suitably journaled in bearings 150 supported within detachable gear housings 151 forming portions of the spaced side portions 78 of the sliding frame 6. It will be noted that the lugs 77 to which the cylinders 75 are secured are desirably integral with the gear housings 151. Keyed to each shaft 149 is a spur gear 152 meshing with a large spur gear 153 which is keyed to a longitudinal shaft 154, likewise suitably journaled within bearings supported within the gear housing. Fixed to each of the shafts 154 is a worm 155 meshing with and driving a worm wheel 156 having its hub 157 suitably journaled on bearings 158 supported by a transverse shaft 159, the latter in turn being supported within the gear housing. Integral with each of the gear hubs 157 is a spur gear 160 meshing with a large spur gear 161 which is keyed to the adjacent end of the transverse shaft 128. Thus, the shaft 128 is driven at both ends, and as the sliding frame 6 is moved along its guideways, the drives between the motors 13 and the opposite ends of the shaft 128 are maintained through the self-adjusting telescopic shaft connections. By arranging the motors 13 at opposite sides of the turntable frame 4, a low compact, symmetrical and well balanced design is attained.

The front loading conveyor 10 will now be described. Guided in guideways provided by a troughlike frame 165 on the sliding frame 6 are endless side chains 166 having transverse flight bars 167 secured thereto for moving the disintegrated material along a top plate 168 secured to vertical side frames 169 secured to the sliding frame. The conveyor chains at the front receiving end of the conveyor pass around front idler rollers 170 secured to a transverse shaft 171 suitably journaled in bearings supported by brackets 173 (Fig. 16) secured to the side plates 169. The conveyor chains, at the rear discharge end of the conveyor, pass around drive sprockets 175 (see Fig. 15) secured to a tubular shaft 176. This shaft is supported by alined end shafts 177 which have polygonal portions 178 received in correspondingly shaped openings or sockets 179 in the sprocket hubs, and these end shafts are suitably journaled in bearings 180 supported by brackets 181 attached to the vertical side frames 169. The front receiving end of the front conveyor extends forwardly and downwardly beneath the rear end of the vein-attacking and disintegrating mechanism, as shown in Fig. 5, and the conveyor frame has flared forwardly diverging sides providing a widened mouth for receiving the disintegrated mineral discharged from the disintegrating chains and for directing the mineral toward the conveyor. The rear end of the conveyor at all times overlies the top of the hopper 9, in positions in each of which the conveyor may discharge disintegrated material into the hopper.

Improved driving means for the front loading conveyor 10 is provided, and this comprises an adjustable-flange pulley 185 secured to one of the front universal couplings 147 driven by one of the motors 13, and this pulley is connected by an endless V-belt 186 to a pulley 187 (see Figs. 7, 8 and 9). The pulley 187 has its hub 188 keyed to a longitudinal shaft 189 suitably journaled in bearings 190 supported within a bearing bracket 191 attached to the adjacent side portion 78 of the sliding frame 6. The shaft 189 drives, through a universal joint 192, a shaft 193 which extends rearwardly along the outer side of the frame of the front conveyor between the latter and the adjacent motor 13, as shown in Fig. 1. The rearward portion of the shaft 193 is splined at 194 to a tubular element 195 of a universal joint 196. The universal joint has an element 197 keyed to a longitudinal shaft 198 suitably journaled in bearings 199 supported within a gear housing 200 attached to the rearward portion of the adjacent side frame 169 of the front conveyor. Secured to this shaft is a worm 201 meshing with and driving a worm wheel 202 secured to the projecting end of the end shaft 177 which drives the chain drive sprockets 175. Thus, the front conveyor 10 is driven through the self-adjusting telescopic shaft connection driven by one of the motors 13 which drives the vein-attacking and disintegrating mechanism. The gear housing 200 is adjustable longitudinally relative to the conveyor frame by set screws 203 engaging lugs on the housings, and the housings have slots with which clamping screws 204 cooperate for securing the housings in adjusted position. By adjusting the housings, the tension of the conveyor chain may be varied as desired.

In this improved construction, the forward side portions 78 of the sliding frame in accordance with my invention are transversely braced by a transverse tubular brace member 222, and formed integral with this brace member is a forwardly and upwardly inclined stripper or so-called "scalper" 223 of V-shape in cross section, preferably composed of welded strips. This stripper member serves to deflect the disintegrated material from the paths of the disintegrating chains and to direct the material toward the front conveyor. Any material which drops beneath the disintegrating chains forwardly of the stripper is deposited on material overlying the shovel or pusher element 12.

It will be noted that the hopper 9 has an upwardly inclined rearward troughlike portion 225, and projecting horizontally and rearwardly from this inclined portion is a vertically tiltable rearward troughlike frame portion 226 which is pivoted on a transverse horizontal axis at 227. Pivoted at 228 on the rearward portion of the frame portion 226 is a laterally swingable rearward frame portion 229, likewise of troughlike form. Circulated in guideways on the frame portions 225, 226 and 229 is a flight conveyor of the universal type comprising a centrally located universal drive chain 230 having a plurality of laterally extending flights 231 thereon. The front receiving end of the rear conveyor extends downwardly within the hopper 9, as shown in Fig. 12, and the conveyor chain passes around a front idler sprocket 232 (see also Fig. 15) secured to a transverse shaft 233. End shafts 234 alined with the shaft 233 has polygonal portions 235 received in correspondingly shaped openings or sockets 236 in the ends of the shaft 233, and the end shafts are journaled in bearings 237 supported within brackets 238 secured to the sides of the hopper. Secured to the opposite sides of the rearward conveyor frame portion 229 are the motors 16 which have their power shafts connected through conventional speed reducing gearings, not shown, to longitudinal shafts 247. Shafts 247 are connected through universal joints 248 to tubular shafts 249 splined to shafts 251. The rear ends of the shafts 251 are connected through universal joints 252 to shafts 253 suitably journaled within gear housings 254 attached to the opposite sides of an adjustable bearing bracket. Secured to the shafts 253 are worms 255 meshing with worm wheels 256 for driving the usual conveyor drive sprocket engaging the conveyor chain 230.

Now referring to the hydraulic fluid system and the associated control means, it will be noted that the shaft of the motor 17 drives a pulley 350 connected through a multiple V-belt drive 351 to a pulley 352 secured to the drive shaft of the pumping means 18. The suction side of the pumping means 18 is connected through a conduit 354 to a liquid reservoir or tank 355. The discharge side of the pumping means is connected through a conduit 356 to the supply passage of a conventional valve mechanism 357. The discharge passage of the valve box is connected through a return conduit 358 back to the tank. The valve box is made up of a series of valve block sections 359 and end sections 360 and 361, and these sections are suitably secured in assembled relation. The end section 360 has an inlet chamber formed therein, while the end section 361 provides the discharge chamber, and the conduit 356 is connected to the inlet chamber and the conduit 358 is connected to the discharge chamber. Associated with the inlet section 360 is a conventional relief valve 362 for connecting the inlet chamber to the discharge passage in the event of overload in the system. The valve block sections 359 have bores containing conventional slide valves of the balanced spool type, respectively, designated 363, 364, 365, 366, 367 and 368. The bore containing the slide valve 363 is connected by a conduit 370 to the lower end of a tilt cylinder 260 for the rearward portion of the rear discharge conveyor 11. The bore containing the slide valve 364 is connected through conduits 371 and 372 to the forward ends of cylinders 280, which effect horizontal swinging of the rearward portion of the rear discharge conveyor. The bore containing the slide valve 365 is connected by a conduit 373 to the head end of a tilt cylinder 211 for the shovel or pusher element 12. The bore containing the slide valve 366 is connected through conduits 374 and 375 to the opposite ends of transverse cylinders 28 for swinging the swiveled supporting frame or turntable 4 about its swivel axis. The bore containing the slide valve 367 is connected through a conduit 376 to the rearward ends of the swinging cylinders 75 for the vein-attacking and disintegrating mechanism 8. A conventional relief valve 377, set to open at a predetermined pressure in the elevating cylinders, is connected by a conduit 378 to the return conduit 358 so that the swing cylinders are connected to exhaust in the event of excessive pressures therein. The bore containing the slide valve 368 is connected through conduits 379 and 380 to the opposite ends of the feed cylinders 66 for moving the shovel and vein-attacking and disintegrating mechanism back and forth along the guideways on the swiveled supporting frame or turntable. The several mechanisms are arranged so that when all of the control valves are in their "off" positions there is a free flow from the conduit 356 to the conduit 358, that when any valve is moved to supply or "on" position, such free flow is interrupted, and, desirably, so that a plurality of valves may simultaneously deliver fluid to the devices they control.

The electrical control apparatus for the several electric motors 13, 14, 16 and 17 comprises an electrical control box 385, to which leads a usual power conductor cable. This control box is arranged at the rear end of the base frame at the left hand side of the apparatus, as shown in Fig. 3. At the rear end of the base, at the right hand side of the apparatus as shown in Figs. 3 and 4, is a starting switch box 386 containing switches having control handles 387 and 388 for controlling the tread driving motors 14. Push button starting switches 389 and 390 are provided for controlling the motors 13, 16 and 17.

Figure 19:
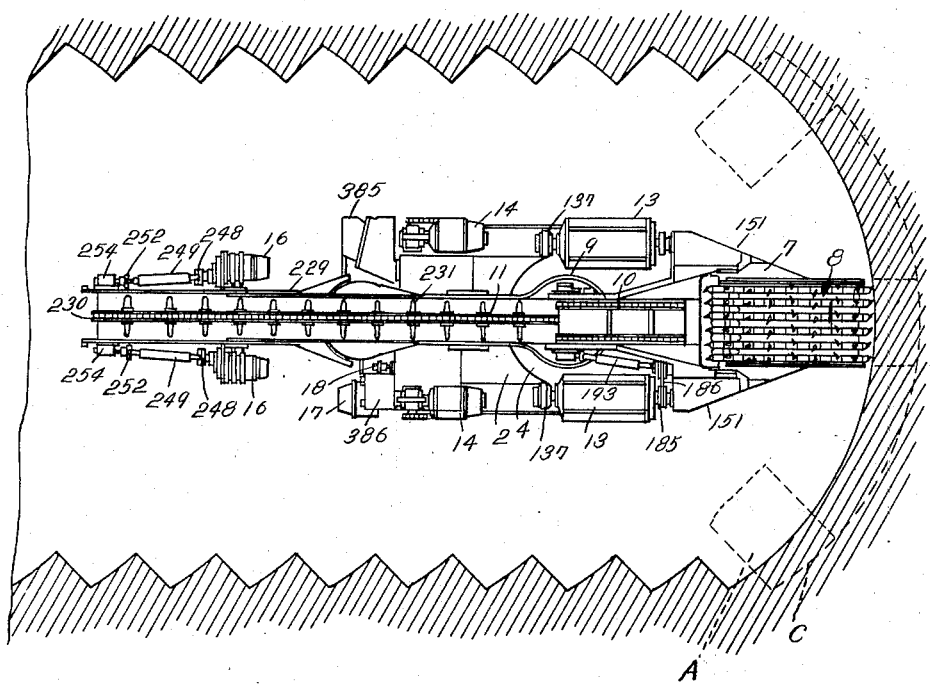
Figs. 19 and 20 are respectively diagrammatic plan and side views, showing the improved mining apparatus in operating position in a mine.
Figure 20:
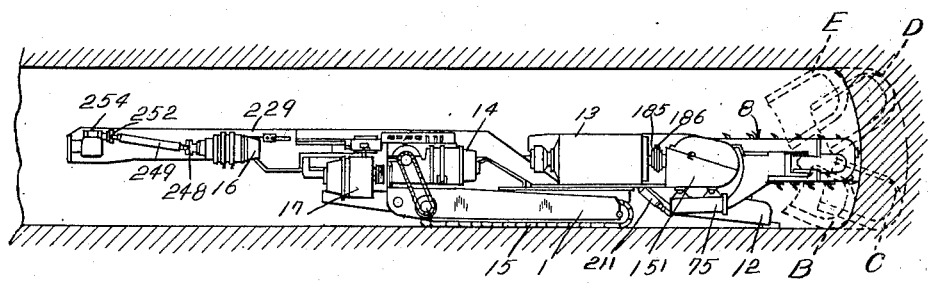

The general mode of operation of the improved mining and loading apparatus is as follows: The apparatus may be propelled about the mine and steered by the motors 14 for driving the crawler treads 15 and controlled by the switch levers 387 and 388. When the apparatus assumes the position adjacent the working face of the coal seam or mine vein, as shown in Figs. 19 and 20, the pump driving motor 17 may be operated to cause the pumping means 18 to build up a pressure in the hydraulic system, and liquid under pressure may be supplied to transverse swing cylinders 28 under the control of the slide valve 366 to effect swinging of the vein-attacking and disintegrating mechanism 8 laterally to the right, into the position indicated in dotted lines at A in Fig. 19. The slide valve 367, controlling liquid flow with respect to the swing cylinders 75, may be positioned to discharge fluid from the cylinders 75 to cause the vein-attacking and disintegrating mechanism to swing downwardly until its outer end portion assumes a position near the level of the mine floor, as indicated in dotted lines at B in Fig. 20. The motor control switches may then be manipulated to effect running of the motors 13 and 16 to effect circulation of the endless disintegrating chains and the conveyor chains within their guideways. The slide valve 365 may then be positioned to effect downward swinging of the shovel 12 to bring its front edge into contact with the mine floor. The slide valve 368, controlling liquid flow with respect to the feed cylinders 66, may then be positioned to supply liquid under pressure to the rear ends of the cylinders to effect forward feeding movement of the vein-attacking and disintegrating mechanism to sump the outer portion thereof into the coal or mineral vein, forwardly to the position indicated in dotted lines at C in Figs. 19 and 20. When the outer portion of the vein-attacking and disintegrating mechanism has been sumped into the coal, liquid may be trapped in the feed cylinders 66 to hold the sliding frame 6 in its advanced position, and the slide valve 367 may be positioned to supply liquid under pressure to the rear ends of the swing cylinders 75 to effect upward swinging of the vein-attacking and disintegrating mechanism to tear out and disintegrate the coal or other mineral between the top of the vein-attacking and disintegrating mechanism and the mine roof. The elevated position of the vein-attacking and disintegrating mechanism is indicated in dotted lines at D in Fig. 20. During upward swinging movement of the vein-attacking and disintegrating mechanism, the swing cylinders 75 apply a rapid and powerful upward thrust to the orbitally moving disintegrating chains so that the coal or other mineral is broken or torn loose in relatively large fragments from the face. Upon completion of the upward swinging operation, liquid may be trapped in the swing cylinders 75 and the slide valve 368 may then be positioned to supply liquid under pressure to the forward ends of the feed cylinders 66 to effect withdrawing movement of the vein-attacking and disintegrating mechanism, to retract the latter to the position indicated in dotted lines at E in Fig. 20, to withdraw the outer portion of the vein-attacking and disintegrating mechanism from the coal seam or mine vein. During the sumping, swinging and withdrawing operations of the vein-attacking mechanism, the coal or other mineral torn loose by the disintegrating elements of the disintegrating chains is conveyed rearwardly along the top runs of the chains to discharge onto the front loading conveyor 10, by which the disintegrated material is conveyed rearwardly to discharge into the hopper 9. The disintegrated material is conveyed by the rear discharge conveyor 11 from the hopper 9 rearwardly of the apparatus to a suitable point of delivery. During the forward sumping movements of the vein-attacking and disintegrating mechanism, the shovel or pusher element 12 pushes forward loose material which has dropped to the mine floor, and brings it into the range or field of operation of the lower runs of the disintegrating chains 85, so that the latter may move it forwardly and then upwardly and rearwardly onto the top of the vein-attacking and disintegrating apparatus, for delivery by the latter to the hopper. The vein-attacking and disintegrating mechanism, by suitable operation of the swing cylinders 28 under the control of the slide valve 366, may be swung in a horizontal direction about the swivel axis of the swiveled supporting frame or turntable 4, to locate the same in different radial positions so that a series of adjacent vertical segments of coal or other mineral may be suitably removed from the working face until the coal across the entire width of the face has been removed and loaded out. The front conveyor 10 is so arranged with respect to the hopper 9 that it discharges into the hopper regardless of the rectilinear or laterally swung position of the vein-attacking and disintegrating mechanism. During any of the operations above described, the slide valves 363 and 364 may be positioned to control the liquid supply with respect to the cylinders 260 and 280 to effect tilting of the rear discharge end of the rear conveyor and to swing the rear discharge end of the rear conveyor laterally into different positions.

As a result of this invention, an improved mining and loading apparatus is provided whereby coal or other minerals may be removed from a solid face of a coal seam or mine vein without the use of explosives, and the dislodged mineral or coal, as it is detached from the mineral vein or coal seam, is continuously conveyed from the vicinity of the working face rearwardly of the apparatus to a suitable point of delivery. By the provision of the novel vein-attacking and disintegrating mechanism and its power operating means, the coal or other mineral may be dislodged or torn from the face in relatively large fragments, greatly expediting the mining operation. The conveyor and hopper arrangement provides extremely effective means for receiving and collecting the disintegrated coal or other mineral discharged from the vein-attacking and disintegrating mechanism, and the associated conveying means serves rapidly to move the disintegrated coal or other mineral rearwardly of the apparatus to a point of delivery remote from the coal face. The shovel or pusher element 12, mounted to move rectilinearly and to swing laterally with the vein-attacking and disintegrating mechanism, cooperates with the disintegrating apparatus in the cleaning up of loose material which has fallen to the mine floor. The rearward end of the shovel or pusher element 12 is open, so that, if conditions permit, loose material on the shovel or pusher element may have the opportunity to attain access to and pass up the front conveyor. As a result of the arrangement of the motors at the opposite sides of the swiveled supporting frame or turntable, and the provision of the self-adjusting driving connections between the motors and the vein-attacking and disintegrating mechanism and the front conveyor, not only is an extremely low compact construction attained, but also a simple and rugged design is afforded. The apparatus is extremely vertically compact, is readily maneuverable, and is extremely flexible in operation, well adapted to meet the demands of service encountered in mining. These and other advantages of the invention will be clearly apparent to those skilled in the art.

This application is a continuation-in-part of my co-pending application Serial No. 47,422, filed September 2, 1948, now abandoned.

While there is in the application specifically described one form which the invention may assume in practice, it will be understood that this form is shown for purposes of illustration and that the invention may be modified and embodied in various other forms without departing from its spirit or the scope of the appended claims.

What I claim as new and desire to secure by Letters Patent is:

1. In a mining and loading apparatus, the combination comprising a support having parallel, laterally spaced, vertical side portions, vein-attacking and disintegrating mechanism for dislodging mineral from a solid mine vein and having its rearward portion arranged between and pivotally mounted on said spaced side portions to swing in vertical planes relative to said support, said mechanism including parallel series of disintegrating elements movable in closely adjacent upright orbital paths, conveying means on said support and including a conveyor having its forward receiving portion extending downwardly between said side portions below the rearward portion of said mechanism, a rigid transverse tubular brace member extending horizontally between and rigidly secured to the upper portions of said side portions for rigidly laterally bracing the latter, said brace member extending transversely of and spaced above said receiving portion of said conveyor in parallelism with the pivotal axis of said mechanism rearwardly of the latter, and stripper means on said transverse brace member, said brace member having at least a portion of its exterior curved, said stripper means comprising upwardly and forwardly converging surfaces meeting along a transverse stripping edge which lies close to the orbital paths of said parallel series of disintegrating elements, one of said converging surfaces extending from the curved exterior of said brace member, said stripper means directing the disintegrated mineral from said series of parallel disintegrating elements downwardly and rearwardly toward said receiving portion of said conveying means.

2. In a mining and loading apparatus, the combination comprising a frame providing horizontal guiding means, a reciprocable support mounted on said frame to move horizontally back and forth along said guiding means, vein-attacking and disintegrating mechanism carried at the forward portion of said support for attacking and disintegrating the mineral of a solid mine vein, a motor carried by said frame and relative to which said support and said mechanism carried thereby are movable, a self-adjusting driving connection between said motor and said mechanism for driving the latter in all of its positions of movement along said guiding means, conveying means carried by said support for receiving the disintegrated mineral discharged from said mechanism and for conveying such mineral rearwardly, and a driving connection between said motor and said conveying means for driving the rearward discharge portion of the latter in all positions of movement of said conveying means along said guiding means with said mechanism, said last mentioned driving connection comprising a conveyor driving element extending rearwardly between said motor and said conveying means and driven through elements of said self-adjusting driving connection.

3. A mining and loading apparatus comprising, in combination, a mobile base, said base having a horizontal frame provided with a central opening and a bearing annulus surrounding said opening, a hopper mounted on said base frame and projecting upwardly through said bearing annulus from the open center of said base frame with the widened portion of said hopper located above said opening, the bottom of said hopper located below said bearing annulus, an annular support surrounding said hopper below said widened upper portion and rotatably mounted on said bearing annulus, a frame carried by and turnable with said annular support and projecting forwardly in advance of said base, a mining mechanism carried by said turnable frame and disposed in advance of said base, and conveying means carried by said turnable frame for receiving disintegrated mineral discharged from said mining mechanism and for conveying the mineral rearwardly to said hopper, said conveying means having its rearward discharge portion overlying said hopper in all angular positions thereof with said turnable frame.

4. A mining and loading apparatus comprising, in combination, a mobile base, said base having a horizontal frame provided with a central opening and a bearing annulus surrounding said opening, a hopper mounted on said base frame and projecting downwardly through said bearing annulus into the open center of said base frame, an annular support surrounding said hopper and rotatably mounted on said bearing annulus, a frame carried by said annular support and projecting forwardly in advance of said base, a reciprocable support guided for rectilinear back and forth movements relative to said frame, a mining mechanism carried by said support and having its effective mining portion disposed in advance of said base and moving in vertical planes relative thereto for dislodging mineral from a solid mine vein, and conveying means carried by said reciprocable support for receiving disintegrated mineral discharged rearwardly from said mining mechanism and for conveying the mineral rearwardly to said hopper, said conveying means arranged to receive the mineral discharged from said mining mechanism irrespective of the positions of angular and rectilinear movements of said mining mechanism during the dislodging operation, said conveying means having its rearward discharge portion overlying said hopper in all angular and rectilinear positions of said conveying means.

5. In combination, supporting means, a hopper mounted on said supporting means in stationary relation with respect thereto, an annular frame surrounding said hopper, means for mounting said annular frame on said supporting means for rotation relative to said hopper, horizontal guiding means secured to said annular frame for rotation therewith and extending in a direction radially of the axis of rotation of the annular frame, a support guided for rectilinear back and forth movements along said guiding means relative to said hopper, conveying means carried by said rectilinearly movable support and having its rear discharge portion overlying said hopper for discharging the material being conveyed into said hopper in all rectilinear positions of said support along said guiding means and in all angular positions of said guiding means relative to said hopper, conveying means mounted on said supporting means for receiving the material discharged into said hopper and for conveying the material in a rearward direction, a material-dislodging and disintegrating mechanism carried by said support for digging material from the solid and for discharging the material rearwardly, and a hopperlike, widened mouth portion provided by said rectilinearly movable support for receiving the material discharged rearwardly from said dislodging and disintegrating mechanism, said conveying means on said support receiving the material discharged into said hopperlike portion and conveying the material in a rearward direction for discharge into said hopper.

6. A mining and loading apparatus comprising, in combination, a base having a horizontal frame provided with a central opening and a bearing annulus surrounding said opening, a hopper mounted on said base frame in stationary relation with respect thereto and projecting upwardly through said bearing annulus within the open center of said base frame, an annular support surrounding said hopper and rotatably mounted on said bearing annulus, a frame carried by and turnable with said annular support and projecting forwardly of said base, said forwardly projecting frame providing a horizontal guideway, a support mounted on said guideway for rectilinear movement back and forth relative to said hopper, a mining mechanism carried by said rectilinearly movable support and having its effective mining portion disposed in advance of said base for dislodging mineral from a solid mine vein, and conveying means carried by said rectilinearly movable support for receiving dislodged mineral discharged rearwardly from said mining mechanism and for conveying the mineral rearwardly to said hopper, said conveying means having its rearward discharge portion overlying said hopper in all angular and rectilinear positions thereof with said support relative to said hopper.

7. In combination, supporting means, a hopper mounted on said supporting means in stationary relation with respect thereto, a frame swivelly mounted on said supporting means to swing horizontally relative to said hopper, said frame providing horizontal guiding means extending in a direction radially of the swivel axis of said frame, a support mounted on said guiding means for rectilinear back and forth movement with respect to said hopper, a vein-attacking and disintegrating mechanism carried by said support for dislodging mineral from a solid mine vein, a self-contained conveyor unit carried by said rectilinearly movable support for receiving the disintegrated mineral discharged from said attacking and disintegrating mechanism and for moving the mineral received thereby rearwardly for discharge into said hopper irrespective of the angular and rectilinear positions of said support with respect to said hopper, said support having a widened hopperlike forward portion in which the disintegrated mineral discharged from said attacking and disintegrating mechanism is received, said conveyor unit extending forwardly and downwardly within said widened hopperlike portion with its forward end portion disposed at the rearward portion of said attacking and disintegrating mechanism below the latter, the rearward discharge portion of said conveyor unit overlying said hopper in all angular and rectilinear positions of said conveyor with said support relative to said hopper.

8. A combination as set forth in claim 7 wherein motor operated driving means is provided for said attacking and disintegrating mechanism including motors operating in unison and mounted on said swiveled frame at the opposite sides of said hopper beyond the outer sides of said guiding means, the tops of said motors being no higher than the top of said rectilinearly movable support, said widened hopperlike portion disposed below the tops of said motors and said support, transmission gearings carried by said support and operatively connected to said attacking and disintegrating mechanism, and extensible driving connections between said motors respectively and said transmission gearings, said motors remaining stationary with respect to said swiveled frame in all rectilinear positions of said support with respect to said hopper.

9. A mining and loading apparatus comprising, in combination, a base having a horizontal frame provided with a central opening and a bearing annulus surrounding said opening, a hopper mounted on said base frame in stationary relation with respect thereto and projecting upwardly through said bearing annulus within the open center of said base frame, said base frame having an annular portion arranged concentrically within said bearing annulus, said hopper being mounted on said concentric annular portion with the bottom of said hopper extending downwardly within said concentric annular portion, an annular support surrounding said hopper and rotatably mounted on said bearing annulus, a frame carried by and turnable with said annular support and projecting forwardly of said base, a mining mechanism carried by said turnable frame in advance of said base for disintegrating the mineral of a solid mine vein, and conveying means carried by said turnable frame for receiving disintegrated mineral discharged rearwardly from said mining mechanism and for conveying the mineral rearwardly to said hopper, said conveying means having its rear discharge portion overlying said hopper in all angular positions thereof with said turnable frame relative to said hopper.

References Cited in the file of this patent

UNITED STATES PATENTS

| | | |
|---|---|---|
| 428,951 | Richards | May 27, 1890 |
| 1,128,880 | Jamison | Feb. 16, 1915 |
| 1,431,857 | Willcox | Oct. 10, 1922 |
| 1,449,088 | Burnell | Mar. 20, 1923 |
| 1,508,634 | Wilson | Sept. 16, 1924 |
| 1,549,699 | Wilson | Aug. 11, 1925 |
| 1,908,434 | Madeira | May 9, 1933 |
| 2,269,781 | Osgood | Jan. 13, 1942 |
| 2,287,230 | Cartlidge | June 23, 1942 |
| 2,415,217 | Osgood | Feb. 4, 1947 |
| 2,418,573 | Cartlidge | Apr. 8, 1947 |
| 2,438,500 | Hertzler | Mar. 30, 1948 |
| 2,564,038 | Stephenson | Aug. 14, 1951 |
| 2,612,361 | Hagenbook | Sept. 30, 1952 |